(12) United States Patent
Dumser

(10) Patent No.: US 10,563,568 B2
(45) Date of Patent: Feb. 18, 2020

(54) PRECHAMBER FOR AN INTERNAL COMBUSTION ENGINE, INTERNAL COMBUSTION ENGINE COMPRISING A PRECHAMBER OF THIS TYPE AND METHOD FOR DESIGNING AND/OR PRODUCING A PRECHAMBER OF THIS TYPE

(71) Applicant: MTU FRIEDRICHSHAFEN GMBH, Friedrichshafen (DE)

(72) Inventor: Frederic Dumser, Hergensweiler (DE)

(73) Assignee: MTU FRIEDRICHSHAFEN GMBH, Friedrichshafen (DE)

( * ) Notice: Subject to any disclaimer, the term of this patent is extended or adjusted under 35 U.S.C. 154(b) by 0 days.

(21) Appl. No.: 15/770,423

(22) PCT Filed: Oct. 6, 2016

(86) PCT No.: PCT/EP2016/001657
§ 371 (c)(1),
(2) Date: Apr. 23, 2018

(87) PCT Pub. No.: WO2017/067637
PCT Pub. Date: Apr. 27, 2017

(65) Prior Publication Data
US 2018/0313256 A1 Nov. 1, 2018

(30) Foreign Application Priority Data
Oct. 21, 2015 (DE) .......................... 10 2015 220 539

(51) Int. Cl.
*F02B 19/16* (2006.01)
*F02B 19/12* (2006.01)
(Continued)

(52) U.S. Cl.
CPC .............. *F02B 19/16* (2013.01); *F02B 19/08* (2013.01); *F02B 19/12* (2013.01); *F02B 43/04* (2013.01);
(Continued)

(58) Field of Classification Search
CPC .......... F02B 19/16; F02B 19/12; F02B 19/08; F02B 43/04; F02B 43/00; F02B 2720/272; F02M 21/02
(Continued)

(56) References Cited

U.S. PATENT DOCUMENTS 2,743,711 A   5/1956   Gross
3,927,520 A   12/1975  Arvin et al.
(Continued)

FOREIGN PATENT DOCUMENTS

DE   2416804 A1   10/1975
DE   3249604 C2   10/1986
(Continued)

*Primary Examiner* — Mahmoud Gimie
(74) *Attorney, Agent, or Firm* — Lucas & Mercanti, LLP; Klaus P. Stoffel

(57) ABSTRACT

A prechamber for an internal combustion engine, including a surface that is situated in the interior of the prechamber and that is impinged by a flow during the operation of the prechamber. The surface has at least one first surface region and at least one second surface region, wherein the first surface region has a defined texture, whereas the second surface region is untextured.

11 Claims, 1 Drawing Sheet

(51) Int. Cl.
*F02M 21/02* (2006.01)
*F02B 19/08* (2006.01)
*F02B 43/04* (2006.01)
*F02B 43/00* (2006.01)

(52) U.S. Cl.
CPC ............ *F02M 21/02* (2013.01); *F02B 43/00* (2013.01); *F02B 2720/272* (2013.01); *Y02T 10/125* (2013.01); *Y02T 10/32* (2013.01)

(58) Field of Classification Search
USPC ........................................................ 123/270
See application file for complete search history.

(56) References Cited

U.S. PATENT DOCUMENTS

| | | | | |
|---|---|---|---|---|
| 4,300,497 | A * | 11/1981 | Webber | F02B 19/02 123/254 |
| 5,163,385 | A * | 11/1992 | McMillian | F02B 19/14 123/23 |
| 9,803,536 | B2 * | 10/2017 | Osaka | F02B 19/08 |
| 2015/0020766 | A1 | 1/2015 | LaPointe et al. | |
| 2015/0128898 | A1 | 5/2015 | Osaka | |

FOREIGN PATENT DOCUMENTS

| | | | |
|---|---|---|---|
| DE | 4035335 | A1 | 5/1992 |
| GB | 2137695 | B | 2/1986 |

* cited by examiner

PRECHAMBER FOR AN INTERNAL COMBUSTION ENGINE, INTERNAL COMBUSTION ENGINE COMPRISING A PRECHAMBER OF THIS TYPE AND METHOD FOR DESIGNING AND/OR PRODUCING A PRECHAMBER OF THIS TYPE

CROSS-REFERENCE TO RELATED APPLICATIONS

The present application is a 371 of International application PCT/EP2016/001657, filed Oct. 6, 2016, which claims priority of DE 10 2015 220 539.8, filed Oct. 21, 2015, the priority of these applications is hereby claimed and these applications are incorporated herein by reference.

BACKGROUND OF THE INVENTION

The invention relates to a prechamber for an internal combustion engine, an internal combustion engine comprising a prechamber of this type and a method for configuring and/or producing a prechamber of this type.

In particular with gas engines which are operated with a lean combustion air/fuel admixture, from a specific bore size of cylinders, which is typically more than 100 mm, an ignition amplifier is used to keep a combustion rate, a center of gravity of the combustion and consequently also an achieved degree of engine efficiency at a desired level. Prechambers are typically used as an ignition amplifier, wherein in a space which is separate from a main combustion chamber but which is connected thereto by means of so-called shot channels an admixture is pre-ignited by means of an ignition device, wherein, as a result of the ignition, an excess pressure in the prechamber is produced with respect to the main combustion chamber so that very hot reaction products and non-combusted admixture flow via the shot channels from the prechamber into the main combustion chamber and ignite the admixture which is arranged at that location. In particular as a result of the large reaction surface of these flame formations discharged from the shot channels, the combustion rate in the main combustion chamber compared with the use of a simple ignition spark with a very small spark volume is generally significantly increased, whereby the combustion duration in the main combustion chamber is also shortened. In particular with particularly large cylinder bores, flushed prechambers are used in which an admixture within the prechamber compared with the admixture in the main combustion chamber can be enriched with a separate fuel supply of the prechamber.

For a stable ignition with low cyclical dispersions, a stable mixture formation which is cyclically as unchanged as possible in the prechamber is an important requirement. However, there are produced during operation of an internal combustion engine cyclical changes from one cycle to the next, for example, in the fuel supply as a result of a fuel rail dynamic, wherein in particular pressure waves run through a fuel supply device or there are formed waves which are standing at that location and which lead to fluctuating pressures in the supply region for the fuel or as a result of cyclical dispersions in the charge change, consequently in particular a gas dynamic in a charge air pipe and/or exhaust gas pipe. There are thereby produced again cyclical fluctuations in the combustion and cyclical differences which may lead to changed flow and concentration relationships in the prechamber and consequently ultimately also to cyclical dispersions in terms of the cylinder power, degree of efficiency and emissions of the internal combustion engine. In this instance, in particular the conditions for the combustion in the prechamber are determined at the time of ignition largely by the flow processes during a compression cycle prior to a top dead center which is associated with an ignition event. In particular rotationally symmetrically constructed prechambers have a very sensitive flow field compared with low cyclical differences in the charge pressure path, residual gas content, fuel flushing pressure path or other effects with the previously mentioned effects on the combustion, cylinder power and emissions since these prechambers—when viewed in a peripheral direction—do not have any outstanding regions or directions so that very easily a spontaneous symmetry breaking with a non-predictable orientation, that is to say, without any specific preferred direction, can be carried out, wherein the flow field can tilt in any direction or angular position. Therefore, the cyclical dispersions in such a prechamber are large.

SUMMARY OF THE INVENTION

An object of the invention is to provide a prechamber for an internal combustion engine, an internal combustion engine with such a prechamber and a method for configuring and/or producing such a prechamber, wherein the disadvantages mentioned do not occur.

The object is in particular achieved by there being provided a prechamber for an internal combustion engine which has a surface which is subjected to flow during operation of the prechamber and which is arranged at an inner side of the prechamber. In this instance, there is provision for the surface to have at least a first surface region and at least a second surface region, wherein the first surface region has a specific structure and wherein the second surface region is free from this structure. The second surface region in particular does not have the specific structure which the first surface region has. The first surface region is distinguished by the specific structure compared with the second surface region. Even if the prechamber is further intended to be constructed in a rotationally symmetrical manner, the arrangement of the specific structure in the first surface region leads to a predetermined symmetry breaking so that in principle a preferred direction in the prechamber is distinguished. The prechamber which is proposed in this instance has advantages compared with the prior art. In particular a main flow of an admixture which is flowing into the prechamber in a compression cycle of an internal combustion engine in which the prechamber is used may be applied directly to the surface in the first surface region with the structure. As a result of the structure, there are formed local turbulences which increase the local turbulence kinetic energy which in turn leads to a local pressure drop along the structured surface. As a result of this local pressure drop, there is produced on the incoming medium a force which leads to an application of the flow to the structured surface. In this instance, the specific structure is in particular configured in such a manner that this force is greater than the forces which are produced as a result of cyclically changing influencing factors so that, with respect to these influencing factors, a cyclically insensitive flow pattern is produced inside the prechamber. To this end, the specific structure preferably comprises a specific surface roughness and/or specific occurrences of unevenness and/or specific breakaway edges. The flow field when fresh admixture flows into the prechamber is consequently defined and constructed in an insensitive manner with respect to external influences. Cyclical fluctuations of the flow pattern within the prechamber are thus significantly reduced so that ultimately cyclical fluctuations in the ignition and thereby in the combustion and in the emission behavior of the internal combustion engine are also reduced. The combustion stability in general is increased and otherwise unstable operating locations become technically accessible. Furthermore, the increased combustion stability can be used in particular indirectly for an increase of the degree of efficiency and for emission reduction—in particular of the hydrocarbon emissions—of the internal combustion engine. A flow field which remains consistent from cycle to cycle and a consistent concentration distribution of a gaseous species in the prechamber at the ignition time in this instance constitute an ideal state which can be approached via the prechamber proposed here in an improved manner.

A prechamber is in particular intended to be understood to be a compartment or space which is divided off from a main combustion chamber of the internal combustion engine and which is connected in fluid terms via at least one bore, preferably a plurality of bores, which are also referred to as shot channels, to the main combustion chamber—in any case in a state of the prechamber mounted on an internal combustion engine. In this instance, a number, an orientation and/or a geometry of these bores may be constructed differently depending on the application of the prechamber. Preferably, the prechamber has an in particular central upward channel via which in a compression cycle of the internal combustion engine fresh admixture can be introduced inside the prechamber.

It is possible for the prechamber to be constructed as a flushed prechamber, wherein in this instance it has a separate fuel supply. In a particularly preferred manner, the prechamber is connected in fluid terms to a fuel flushing channel or has a fuel flushing channel for supplying additional fuel to the prechamber. The use of a flushed prechamber has been found to be particularly advantageous with large-volume piston displacements since in this manner an ignition energy which is again increased with respect to unflushed prechambers can be provided.

It is also possible for the prechamber to be constructed as an unflushed prechamber. In this instance, the prechamber does not have any separate fuel supply, instead a flammable combustion air/fuel admixture is supplied to the prechamber exclusively via the bores which are connected in fluid terms to the main combustion chamber during a compression cycle. Such unflushed prechambers are constructed in a particularly simple and therefore cost-effective manner, in particular since a separate fuel supply can be dispensed with.

It is possible for the prechamber to be constructed in a cylinder head of the internal combustion engine, wherein it may in particular be constructed in an integral manner with the cylinder head. Alternatively, it is possible for the prechamber to be part of a pre-chamber ignition device, in particular a prechamber spark plug, wherein in particular an ignition element of the ignition device is surrounded by a wall through which at least one bore extends, whereby the prechamber is constructed. The prechamber can in this instance be replaced together with the ignition device.

There is arranged in the prechamber in particular an ignition device or an ignition element which may, for example, be configured for electrical spark ignition, for laser ignition, for a corona ignition or generally high-frequency ignition, or for ignition by means of pilot stream injection of an explosive substance. In principle, any configuration of an ignition device for igniting the flammable admixture can be used in the prechamber.

The fact that the surface is subjected to flow during operation of the prechamber means in particular that along the surface during operation—in particular in a compression cycle of an internal combustion engine which the prechamber has—a gas flow flows along the surface or passes over the surface. In this instance, this gas flow may have combustion air, fuel and/or an admixture of combustion air and fuel.

An inner side of the prechamber refers in this instance in particular to an inner space which is surrounded by a prechamber wall and which in the assembled state is connected in fluid terms via at least one bore to a main combustion chamber. The inner side is in particular the portion of the prechamber in which the ignition device or the ignition element is arranged. The surface which is subjected to flow in particular faces the inner side of the prechamber.

The fact that the structure is a specific structure means in particular that it does not result by chance from a production method for the prechamber but instead is introduced in a selective manner into the first surface region or is provided on the first surface region. This is thus in particular a procedure which extends beyond a where applicable conventional surface processing operation for a prechamber wall and which is used in order to arrange the structure on the first surface region. In this instance, in particular both the first surface region is selectively selected and the structure is arranged in a specific predetermined manner on the first surface region.

The fact that the first surface region has the specific structure means in particular that the first surface region is constructed in a structured manner. In particular the second surface region is in comparison therewith constructed in an unstructured manner or does not have in any case the structuring which the first surface region has.

According to a development of the invention, there is provision for the surface which is subjected to flow to be constructed as a surface of an inner wall of the prechamber. Consequently, the surface readily faces the inner side of the prechamber and is directly and immediately in the position to influence the flow behavior in the prechamber.

According to a development of the invention, there is provision for the specific structure to be constructed integrally with the inner wall. In particular, the specific structure is preferably introduced into the inner wall or constructed on the inner wall. This may, for example, be carried out by means of etching, stamping, by means of a machining processing operation, by means of a generative method with which the structure is constructed on the surface, or by means of another suitable method.

According to a development of the invention, there is alternatively provision for the structure to be constructed in multiple pieces with the inner wall. To this end, it is, for example, possible for the structure to be constructed on an additional element, in particular an inlay element or insertion element which is connected to the inner wall in the first surface region. It is possible in this manner for the production of the specific structure to be simplified since it can be constructed not directly on the inner wall, but instead separately on the insertion element or inlay element. The insertion element or inlay element may, for example, be soldered to the inner wall, welded or secured thereto in another suitable manner.

According to a development of the invention, there is provision for the structure to have a plurality of structural elements, wherein the structural elements may in particular be projections and/or recesses, wherein the structural elements—when viewed in longitudinal section—are constructed in a spheroid manner, that is to say, approximately in a spherical manner or in a spherical manner, in particular in a hemispherical manner, that is to say, in particular in a semispherical manner.

A longitudinal section is in this instance intended to be understood to be a plane of section in which—in a state of the prechamber assembled on an internal combustion engine—a displacement direction of a piston which can be displaced in the combustion chamber is located. A longitudinal direction of the prechamber is in particular intended to be understood to be the direction which preferably at the same time corresponds to the longitudinal direction of an ignition device on the internal combustion engine.

Additionally or alternatively, there is preferably provision for the structural elements—when viewed in longitudinal section—to be constructed in a triangular or tooth-like manner, wherein they preferably have a sharp or rounded tip. A triangular or tooth-like shape of the structural elements describes in particular that they have a tip which faces away from the surface subjected to flow and faces the inner side of the prechamber. This tip may be sharp-edged or—in particular with a specific corner radius which represents the radius of curvature of the tip—may be rounded. Such triangular or tooth-like structural elements may in particular act as breakaway edges for a gas flow which flows along the surface.

Additionally or alternatively, there is preferably provision for the structural elements—when viewed from above—to be circular.

In this instance, a plan view refers in particular to a viewing direction perpendicular to the surface which is subjected to flow—in particular virtually from a center of the inner side of the prechamber.

Additionally or alternatively, there is preferably provision for the structural elements—when viewed from above—to be constructed in an elliptical or oval manner.

Additionally or alternatively, there is preferably provision for the structural elements—when viewed from above—to be constructed in a rectangular, in particular square, manner. This embodiment is quite particularly preferred for structural elements which are triangular or tooth-like when viewed in longitudinal section and in which the tip is then an edge of the rectangle or square which constitutes a tip when viewed in longitudinal section.

Additionally or alternatively, there is preferably provision for the structural elements—when viewed from above—to be constructed in a drop-like manner. In this instance, a drop-like form describes in particular a form in which a width of the structural elements varies when viewed in a longitudinal direction. In this instance, the structural elements are preferably less wide in an upper region of a respective structural element than in a lower region of the same structural element. In this instance, the term "lower" describes here a side of the structural element which faces the main combustion chamber in the assembled state, whilst the term "upper" refers to a side of the structural element which—again in the assembled state—faces away from the main combustion chamber.

Additionally or alternatively, there is preferably provision for the structural elements—when viewed from above—to be constructed in a triangular manner.

The shapes and/or geometries which are particularly proposed here for structural elements are particularly suitable for acting as breakaway edges or turbulences for the gas flow along the surface which is subjected to flow so that a main flow in the first surface region can effectively be applied.

According to a development of the invention, there is provision for the specific structure to have structural elements which—when viewed from above—have a diameter or a width of from at least 0.02 mm to a maximum of 2 mm. The diameter as a measurement can, however, in particular be used for structural elements which are circular when viewed from above. With other geometries of the structural elements which differ from the circular shape, a width preferably refers to a dimension which is measured when viewed from above in a direction which is perpendicular to the longitudinal direction.

Additionally or alternatively, the structural elements preferably have a height (in particular in the case of protrusions) or a depth (in particular in the case of recesses) of from at least 0.02 mm to a maximum of 2 mm. The height or depth is in this instance measured in particular in the longitudinal plane of section and perpendicularly to a central surface contour of the surface which is subjected to flow, in each case from a highest point of a structural element as far as a lowest point of the structural element.

Additionally or alternatively, there is preferably provision for the structural elements to have a length of from at least 0.04 mm to a maximum of 4 mm. In this instance, a length refers to a measurement which is again measured as a plan view along the extension of the structural elements in the longitudinal direction, that is to say, in particular perpendicular to the width. Non-circular structural elements thus have—when viewed from above—in particular a width perpendicular to the longitudinal direction and a length in the longitudinal direction.

Additionally or alternatively, there is preferably provision for the structural elements to have a—preferably shortest—spacing from each other of from at least 0.02 mm to a maximum of 1 mm, preferably of from at least 0.04 mm to a maximum of 1 mm. In particular, directly adjacent structural elements preferably have a shortest spacing from each other in one of the mentioned regions.

Additionally or alternatively, there is preferably provision for the structural elements to have a corner radius or radius of curvature of from at least 0.01 mm to a maximum of 1 mm. This applies in particular to triangular or tooth-like structural elements which have a rounded tip, wherein in this instance the corner radius or radius of curvature of the tip is referred to.

The measurements which are specifically proposed in this instance for the structural elements have been found to be particularly suitable to ensure a safe and effective application of a main flow to the surface which is subjected to flow in the first surface region.

The object is also achieved by there being provided an internal combustion engine which has a prechamber according to any one of the above-described embodiments. In this instance, in particular the advantages which have already been described in connection with the prechamber are afforded in connection with the internal combustion engine.

According to a preferred embodiment, the internal combustion engine is constructed as a gas engine. In a particularly preferred manner, the internal combustion engine is constructed as a mixture-compressing gas engine. Additionally or alternatively, the internal combustion engine is preferably constructed as a lean gas engine. It is thus preferably operated with a lean combustion air/combustion gas admixture in the main combustion chamber and/or in the prechamber. It is possible for the prechamber to be constructed as a flushed prechamber, wherein the admixture present in the prechamber is enriched via a separate fuel supply for the prechamber. In this instance, the admixture in the prechamber—regardless of the absolute composition thereof—has in any case a less lean composition than the admixture in the main combustion chamber.

It has been found that the advantages connected with the prechamber proposed in this instance are afforded in particular with a gas engine, in particular with a mixture-compressing lean gas engine.

According to a development of the invention, there is provision for the internal combustion engine to be constructed as a stationary gas engine. In this instance, the internal combustion engine is preferably permanently operated at a stationary operating point, for example, when driving a generator to produce electrical power and/or when driving conveyor pumps, for example, in the field of conveying fossil raw materials. In this instance, from operating cycle to operating cycle or from cycle to cycle in the internal combustion engine, with the exception of potential standing or running pressure waves in a fuel supply, in the charge path and/or in the exhaust gas path, there are produced constant conditions for the combustion as a result of the stationary operating location. With the prechamber proposed in this instance, the influence of these fluctuations which still exist in the behavior of the internal combustion engine can be eliminated to the greatest possible extent so that the internal combustion engine can be operated with extremely low cycle fluctuations, consequently a very low dispersion in terms of the combustion properties and also the emissions.

The internal combustion engine is preferably constructed as a piston engine. It is possible for the internal combustion engine to be configured for driving a passenger vehicle, truck or a utility vehicle. In a preferred embodiment, the internal combustion engine serves to drive in particular heavy land or water-borne vehicles, for example, mining vehicles, trains, wherein the internal combustion engine is used in a locomotive or a railcar, or ships. Use of the internal combustion engine for driving a vehicle used for defense, for example, a tank, is also possible. An embodiment of the internal combustion engine is preferably also used in a stationary manner, for example for stationary power supply during emergency power operation, continuous load operation or peak load operation, wherein the internal combustion engine in this instance preferably drives a generator. A stationary use of the internal combustion engine for driving auxiliary units, for example, fire extinguishing pumps on oil rigs, is also possible. Furthermore, an application of the internal combustion engine in the field of conveying fossil raw materials and in particular fuels, for example, oil and/or gas, is possible. Use of the internal combustion engine in the industrial field or in the construction field, for example, in a construction or building machine, for example, in a crane or in a digger, is also possible. The internal combustion engine is preferably constructed as a diesel engine, petrol engine, gas engine for operation with natural gas, biogas, special gas or another suitable gas. In particular when the internal combustion engine is constructed as a gas engine, it is suitable for use in a block heating power station for stationary production of energy.

The object is also achieved by a method for configuring and/or producing a prechamber for an internal combustion engine which has the following steps: a prechamber geometry having a surface which is subjected to flow during operation of the prechamber and which is arranged inside the prechamber is provided. A gas flow inside the prechamber is simulated. In particular with reference to the simulation, a surface region which is suitable for an application of the gas flow to the surface with regard to a stabilization of the gas flow is identified. A specific structure is provided in the surface region, wherein the specific structure is provided in such a manner that the gas flow is applied to the surface in the region of the specific structure. In the context of the method, the advantages which have already been explained in relation to the prechamber are in particular afforded.

The fact that a prechamber geometry is provided means in particular that as a starting point for the simulation of the gas flow the geometry of an existing or projected prechamber—still without the specific structure—is preferably provided in the form of machine-readable data in such a manner that the simulation can be carried out on the basis of the prechamber geometry provided.

The simulation of the gas flow inside the prechamber is carried out in particular for the operation thereof during one or more compression cycles of an internal combustion engine which is operated with the prechamber. In the context of the simulation, it is therefore considered how the gas flow in the compression cycle of the internal combustion engine behaves inside the prechamber. In this instance, in particular cyclical changes may be examined in a flow field in the prechamber and/or it is possible to identify regions of the prechamber which are decisive for the formation of the flow field. In particular in the case of a rotationally symmetrical prechamber, however, it is possible for no regions which are decisive in a prominent manner for the formation of the flow field to be provided so that ultimately the specific construction of the flow field is subjected to significant cyclical fluctuations, wherein it is highly dependent on peripheral and/or initial conditions.

A surface region which is suitable for the application of the gas flow to the surface may, for example, be identified in that a surface region which is decisive for the formation of the gas flow is found in the context of the simulation and identified as a suitable surface region. If this is not the case—in particular with a rotationally symmetrical prechamber—a suitable surface region can also be identified by a specific structure—or also a plurality of specific structures—being arranged on different surface regions of the prechamber by way of tests and in each case the gas flow inside the prechamber being examined by means of repeated simulation for the different surface regions. A comparison of the results of these different simulations then enables identification of at least one surface region which is suitable, with respect to a stabilization and—when considered from cycle to cycle—homogenization of the flow field within the prechamber, wherein this may in particular be a surface region in which the arrangement of the specific structure in this surface region leads to a fluctuation range in the configuration of the flow field from cycle to cycle being minimal. Alternatively or additionally, it may also be examined in which surface region and/or in which specific structure the gas flow is applied particularly powerfully to the surface in the region of the specific structure.

By means of variation of the specific structure and repeated simulation of the gas flow with a respective specific structure, it is also possible to establish a configuration of the specific structure which is optimized for a specific prechamber.

The fact that the surface region is particularly suitable or favorable for the application of the gas flow to the surface means in particular that a specific structure which is arranged in this surface region—as already set out—in a particular manner leads to a stabilization of the gas flow inside the prechamber. Furthermore, the favorable or suitable property of the surface region relates in particular to a homogenization and/or improvement of the combustion properties of an internal combustion engine which is provided with the prechamber, with particular regard to the ignition and/or the burn-through of a combustion air/fuel admixture and/or to the degree of efficiency of the internal combustion engine.

The fact that the specific structure is provided in the surface region includes the fact that construction plans or workshop drawings and/or suitable directions for producing the prechamber are provided in order to be able to produce a prechamber with the specific structure in the surface region. In particular as a result of the simulation and the identification of the surface region and preferably the selection of the specific structure, a decision is thus made regarding the specific configuration of the prechamber and corresponding workshop drawings, construction plans or directions are produced.

Preferably, the prechamber is produced according to the method. This includes, on the one hand, a specific structure being arranged in an existing prechamber in a specific surface region, for example, by means of surface treatment of an inner wall of the prechamber, in particular by means of etching, stamping, a machining processing operation, generative application or other suitable measures, or by means of arrangement in the prechamber of an insert or inlay which has the specific structure. However, it is also possible for the prechamber to be completely produced from new, wherein the specific structure is arranged or constructed in the first surface region.

The surface region and/or the specific structure is/are in particular selected in such a manner that a force which acts on the gas flow as a result of a local pressure drop in the surface region is greater than the forces which are produced by means of cyclically changing influencing factors on the gas flow. It is thus possible with respect to these influencing factors to produce a cyclically insensitive flow pattern within the prechamber.

The description of the prechamber and the internal combustion engine, on the one hand, and the method, on the other hand, are intended to be understood to complement each other. Features of the prechamber and/or the internal combustion engine which have been explained explicitly or implicitly in connection with the method are preferably individually or in a state combined with each other features of a preferred embodiment of the prechamber or the internal combustion engine.

Method steps which have been explained explicitly or implicitly in connection with the prechamber and/or the internal combustion engine are preferably individually or in a state combined with each other steps of a preferred embodiment of the method. This is preferably distinguished by means of at least one method step which is determined by at least one feature of an embodiment of the prechamber or the internal combustion engine which is preferred or in accordance with the invention. The prechamber and/or the internal combustion engine is/are preferably distinguished by at least one feature which is determined by at least one step of an embodiment of the method which is preferred or in accordance with the invention.

BRIEF DESCRIPTION OF THE DRAWING

The invention is explained in greater detail below with reference to the drawings, in which.

DETAILED DESCRIPTION OF THE INVENTION

Figure 1:
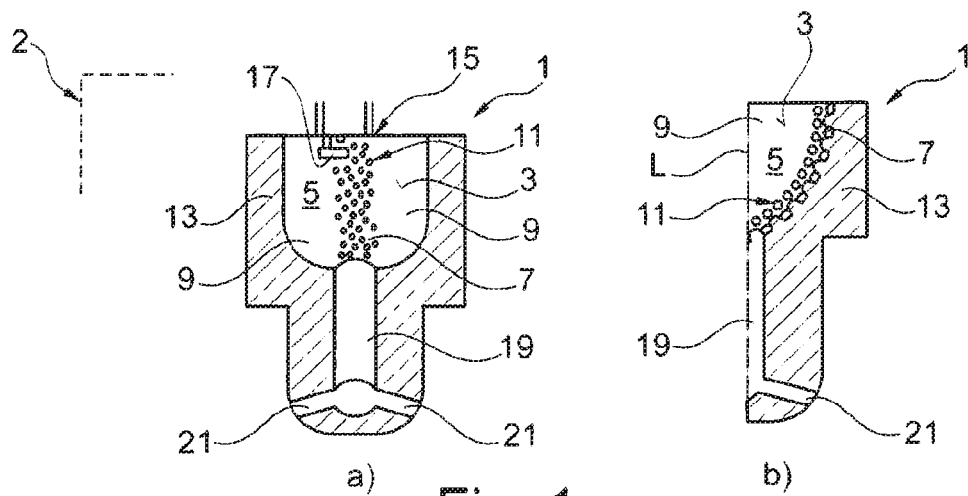
FIG. 1 is a schematic illustration in two views of an embodiment of a prechamber.

FIG. 1 shows an embodiment of a prechamber 1 of an internal combustion engine 2, wherein the prechamber 1 is illustrated in FIG. 1a) in a first plane of longitudinal section and in FIG. 1b) in a second plane of longitudinal section which is rotated about a longitudinal axis L with respect to the first plane of longitudinal section as a half-section. The prechamber 1 for the internal combustion engine 2 has a surface 3 which is subjected to flow during operation of the prechamber 1 and which is arranged at an inner side 5 of the prechamber 1. The surface 3 which is subjected to flow has a first surface region 7 and a second surface region 9, wherein the first surface region 7 has a specific structure 11 and wherein the second surface region 9 is free from this structure 11, wherein it thus does not have the specific structure 11. Preferably, the surface 3 is constructed in the second surface region 9 so as to be unstructured and/or smooth.

The second surface region 9 preferably extends—when viewed in a peripheral direction—from a first—in FIG. 1a) right-side of the first surface region 7 to a second—in FIG. 1a) left-side of the first surface region 7, that is to say, almost completely peripherally with the exception of a peripheral portion in which the first surface region 7 is arranged. However, it is also possible for the surface 3 to have more than a first surface region 7. Alternatively or additionally, it is possible for the surface 3 to have more than a second surface region 9.

A longitudinal direction extends in the direction of the longitudinal axis L illustrated in FIG. 1b). A peripheral direction engages around the longitudinal direction concentrically. A radial direction is perpendicular to the longitudinal direction.

The surface 3 is in this instance constructed as a surface of an inner wall 13, wherein the inner wall 13 surrounds the inner side 5 of the prechamber 1.

In FIG. 1b), it is illustrated that the specific structure 11 is constructed in this instance integrally with the inner wall 13, wherein it is preferably directly incorporated into the surface 3 or formed out of it.

At the inner side 5 of the prechamber 1, in a manner known per se an ignition device 15 or an ignition element 17 of the ignition device 15, for example, an electrode pair for producing a spark ignition, is arranged.

The inner side 5 is connected by means of at least one bore, in this instance specifically by means of a upward channel 19, and side channels 21 to a main combustion chamber which is not illustrated in the state of the prechamber 1 mounted on the internal combustion engine 2.

During a compression cycle of the internal combustion engine 2, a gas flow flows, in particular a combustion air/fuel admixture, via the side channels 21 and the upward channel 19 into the inner side 5 of the prechamber 1. In this instance, as a result of the specific structure 11, there is produced at the inner side 5 a defined flow field which is insensitive with respect to external fluctuations, in particular cyclical fluctuations, during operation of the internal combustion engine 2. In this instance, the specific structure 11 is arranged in the first surface region 7 in which a main flow of the gas flow is applied directly to the surface 3. In this instance, local turbulences are formed and the local turbulence kinetic energy is increased. This leads to a local pressure drop along the structured surface region 7. As a result of this local pressure drop, there is produced on the gas flow a force which leads to the application thereof to the structured surface region 7. The specific structure 11 is in this instance selected in such a manner that this force is greater than forces which are produced by cyclically changing influencing factors so that, compared with these influencing factors, a cyclically insensitive flow pattern is produced inside the prechamber 1.

Figure 2:
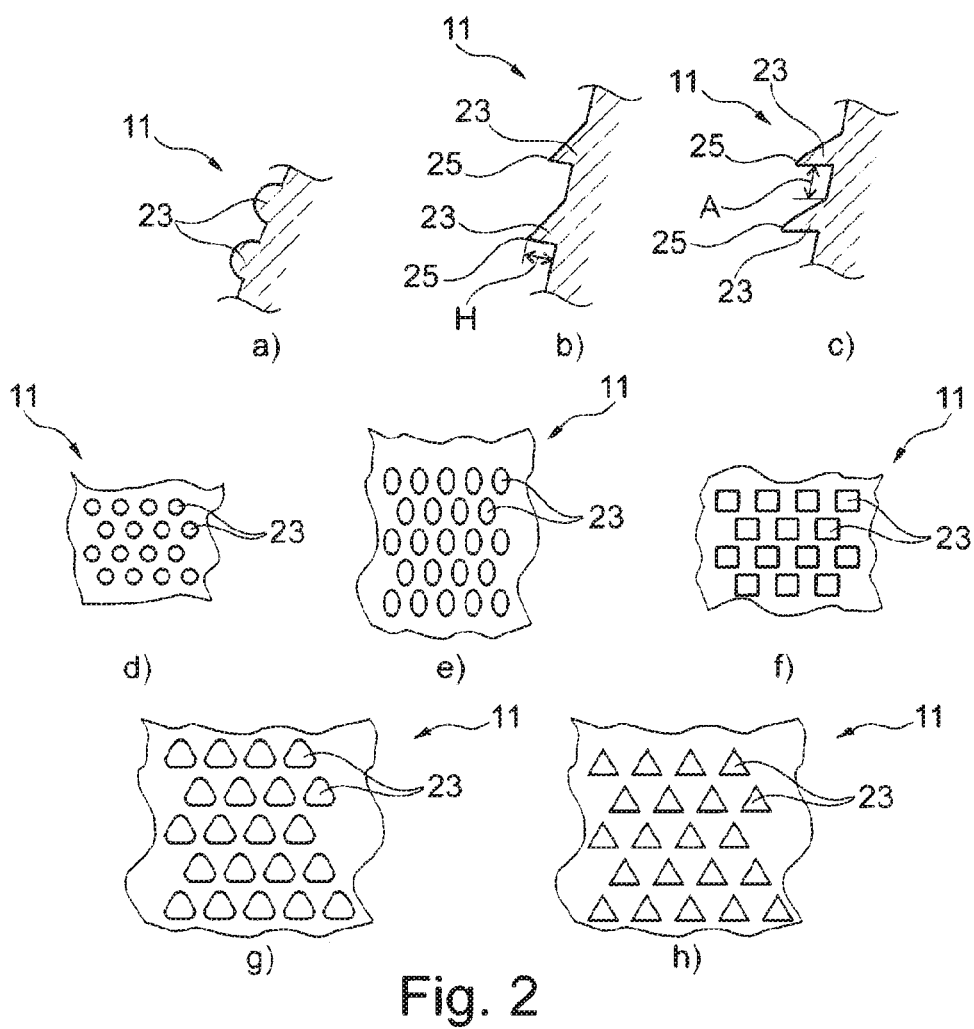
FIG. 2 shows a plurality of views of different embodiments of specific structures for the prechamber.

FIG. 2 shows illustrations of a plurality of embodiments of specific structures 11. Elements which are identical and functionally identical are provided with the same reference numerals so that in this regard reference may be made to the above description. It has been found that the specific structure 11 preferably has a plurality of structural elements 23 which may in particular be constructed as protrusions and/or as recesses.

FIGS. 2a), 2b) and 2c) are each longitudinal sections through specific structures 11. In this instance, the structural elements 23 in the embodiment according to FIG. 2a) are constructed in particular in a hemispherical manner, consequently in a semi-spherical manner.

In FIG. 2b), the structural elements 23—when viewed in longitudinal section—are constructed in a triangular or tooth-like manner, wherein they have a sharp tip 25.

In FIG. 2c), the structural elements 23 are also—when viewed in longitudinal section—constructed in a triangular or tooth-like manner, wherein they, however, have a rounded tip 25 with a corner radius or radius of curvature. The corner radius or radius of curvature is preferably from at least 0.01 mm to a maximum of 1 mm.

A height H of the structural elements 23 which is illustrated in this instance by way of example in FIG. 2b) is generally—regardless of the specific shape of the structural elements 23—preferably from at least 0.02 mm to a maximum of 2 mm. This preferably also applies accordingly to a depth of structural elements which are not constructed as protrusions but instead as recesses.

A spacing of adjacent structural elements 23 from each other which is designated A by way of example in FIG. 2c) is—again regardless of the specific shape of the structural elements 23—preferably from at least 0.02 mm to a maximum of 1 mm, preferably from at least 0.04 mm to a maximum of 1 mm. In this instance, in a particularly preferred manner, in principle the shortest spacing—regardless of the direction in which it extends—is considered between directly adjacent structural elements 23.

FIGS. 2d) to 2h) are plan views of specific structures 11, consequently as the same view on which the illustration of FIG. 1a) is also based.

In this instance, the structural elements 23 in the embodiment according to FIG. 2d) are constructed in a circular manner.

In the embodiment according to FIG. 2e), the structural elements 23—when viewed from above—are constructed in an elliptical or oval manner.

The structural elements 23 which are illustrated in FIGS. 2d) and e) may in particular be constructed in longitudinal section as illustrated in FIG. 2a).

FIG. 2f) illustrates an embodiment of the specific structure 11 in which the structural elements 23—when viewed from above—are constructed in a rectangular, in particular square manner. They may in particular—when viewed in longitudinal section—be constructed as illustrated in FIG. 2b) or 2c).

FIG. 2g) illustrates an embodiment of the specific structure 11 in which the structural elements 23 have a drop-like form. In this instance, they are preferably in particular at an upper end facing the ignition device 15 constructed to be narrower than at a lower end facing away from the ignition device 15 and at an end facing a main combustion chamber which is not illustrated.

FIG. 2h) shows an embodiment of the specific structure 11 in which the structural elements 23 are constructed in a triangular manner.

The drop-like structural elements 23 according to FIG. 2g) can—when viewed in longitudinal section—be constructed as illustrated in FIG. 2a), but it is also possible for them to be constructed as illustrated in FIG. 2b) or 2c). The triangular structural elements 23 according to FIG. 2h) are—when viewed in longitudinal section—preferably constructed as illustrated in one of the Figures in FIG. 2b) or 2c).

The structural elements 23 which are illustrated in FIG. 2b) and which are circular when viewed from above preferably have a diameter of from at least 0.02 mm to a maximum of 2 mm.

Furthermore, the structural elements 23 preferably have a measured width—perpendicularly to the longitudinal axis L and horizontally in the image plane of FIG. 2—of from at least 0.02 mm to a maximum of 2 mm. The width extends in this instance in particular perpendicularly to a main flow direction of the gas flow at the inner side 5 during a compression cycle of the internal combustion engine 2.

The structural elements 23 preferably have a length—in the longitudinal direction or along a projection of the longitudinal direction L when looking toward the surface 3—which extends in FIG. 2 in the image plane in a vertical direction which is from at least 0.04 mm to a maximum of 4 mm. In this instance, the length extends substantially in the direction of a main flow direction of the gas flow at the inner side 5 during a compression cycle of the internal combustion engine 2.

The drop-like structural elements 23 according to FIG. 2g) preferably have a corner radius or radius of curvature in the corners of from at least 0.01 mm to a maximum of 1 mm.

On the whole, it has been found that with the prechamber 1 and the internal combustion engine 2 and using the method there can be provided a structure or geometry for a prechamber which leads to a reduction of the typical fluctuations of a flow pattern inside the prechamber so that cyclical fluctuations in the ignition and thereby in the combustion of the internal combustion engine 2 are also reduced. This increases the combustion stability in general and may in particular be used technically at otherwise unstable operating locations. At the same time, the increased combustion stability can be used indirectly for an increase of the degree of efficiency and for emission reduction—with particular regard to hydrocarbon emissions—of the combustion cycle.

The invention claimed is:

1. A prechamber for an internal combustion engine, comprising:
   a surface that is subjected to flow during operation of the prechamber and which is arranged at an inner side of the prechamber, wherein the surface has at least a first surface region and at least a second surface region, wherein the first surface region has a specific structure, wherein the second surface region is free from the specific structure, wherein the surface that is subjected to flow is a surface of an inner wall of the prechamber, wherein the specific structure of the first surface region is arranged so that a rotational symmetry is broken due to the arrangement of the specific structure in the first surface region.

2. The prechamber according to claim 1, wherein the specific structure is constructed integrally or in multiple pieces with the inner wall.

3. The prechamber according to claim 1, wherein the specific structure has structural elements, which are
   a) spheroidal when viewed in longitudinal section and/or,
   b) tooth-like with a sharp or rounded tip when viewed in longitudinal section, and/or,
   c) circular when viewed from above, and/or,
   d) elliptical or oval when viewed from above, and/or,
   e) rectangular when viewed from above, and/or,
   f) drop-like when viewed from above, and/or
   g) triangular when viewed from above.

4. The prechamber according to claim 3, wherein the structural elements that are hemispherical in longitudinal section.

5. The prechamber according to claim 3, wherein the structural elements are square when viewed from above.

6. The prechamber according to claim 1, wherein the specific structure has structural elements that have
   a) a diameter or a width of from at least 0.02 mm to a maximum of 2 mm, and/or
   b) a height or a depth of from at least 0.02 mm to a maximum of 2 mm, and/or
   c) a length of from at least 0.04 mm to a maximum of 4 mm, and/or
   d) a spacing from each other of from at least 0.02 mm to a maximum of 1 mm, and/or
   e) a corner radius of from at least 0.01 mm to a maximum of 1 mm.

7. The prechamber according to claim 6, wherein the structural elements are spaced from each other from at least 0.04 mm to a maximum of 1 mm.

8. An internal combustion engine, comprising a prechamber according to claim 1.

9. The internal combustion engine according to claim 8, wherein the internal combustion engine is a gas engine.

10. A method for configuring and/or producing a prechamber for an internal combustion engine, comprising the steps of:
    providing a prechamber geometry of a prechamber having a surface that is subjected to flow during operation of the prechamber, wherein the surface that is subjected to flow is a surface of an inner wall of the prechamber;
    simulating a gas flow at an inner side of the prechamber;
    identifying a surface region which is suitable for an application of the gas flow to the surface with regard to a stabilization of the gas flow; and
    providing a specific structure in the surface region, wherein the specific structure is provided so that the gas flow is applied to the surface in the region of the specific structure, wherein a rotational symmetry is broken due to the arrangement of the specific structure in the surface region.

11. The method according to claim 10, wherein the surface of the prechamber has a second surface region without the specific structure.

\* \* \* \* \*